Dec. 15, 1959   R. E. DARGIE   2,916,857
LENS SURFACING MACHINES
Filed Feb. 14, 1958   4 Sheets-Sheet 1

INVENTOR
ROBERT E. DARGIE
BY
Louis L. Gagnon
ATTORNEY

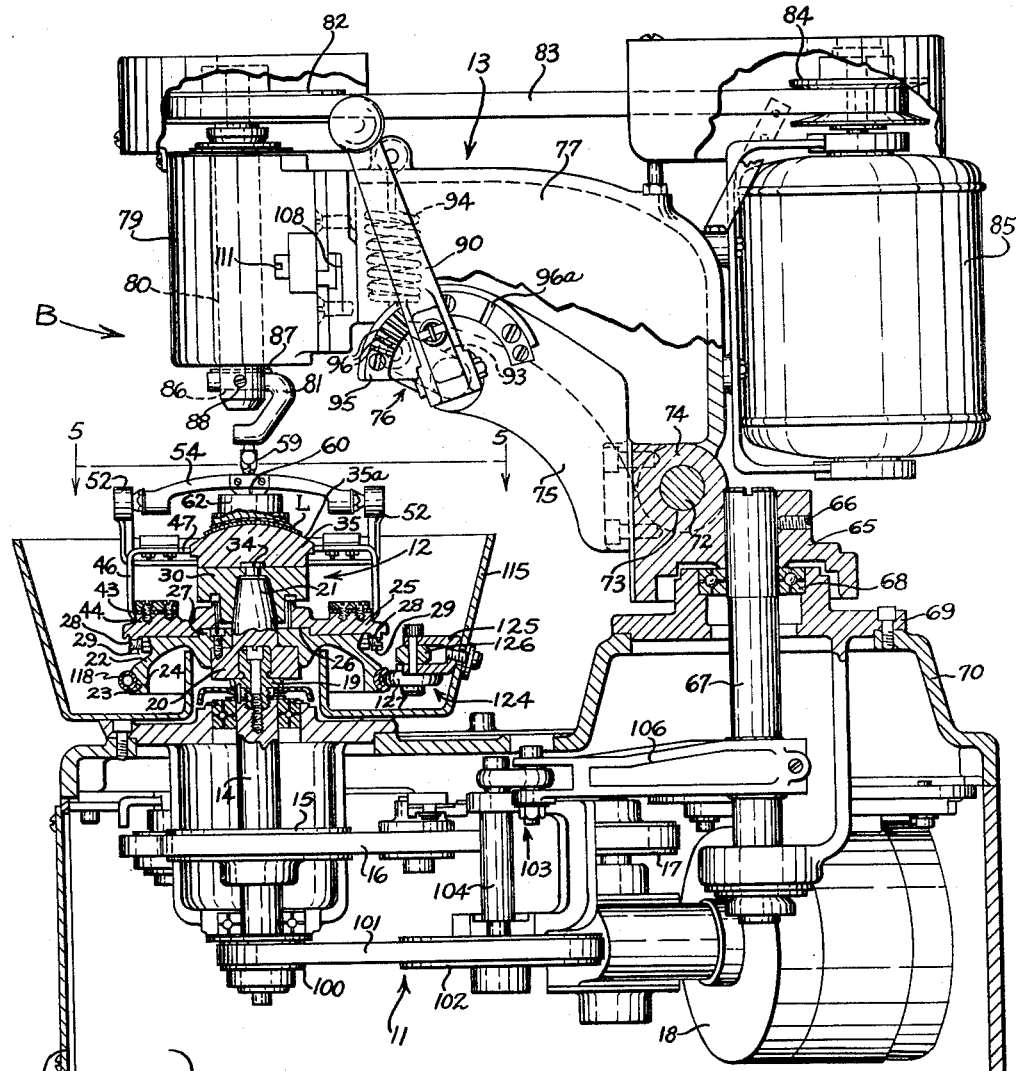
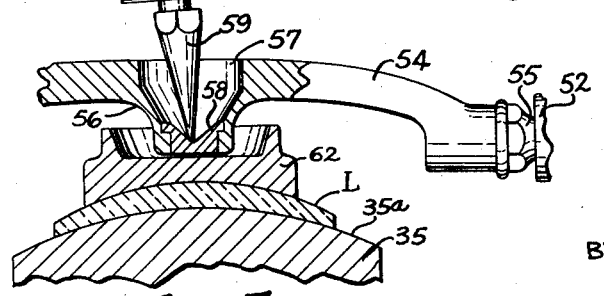
Fig. 2
Fig. 7
INVENTOR
ROBERT E. DARGIE
BY
Louis L. Gagnon
ATTORNEY INVENTOR
ROBERT E. DARGIE
BY
Louis L. Vagnon
ATTORNEY

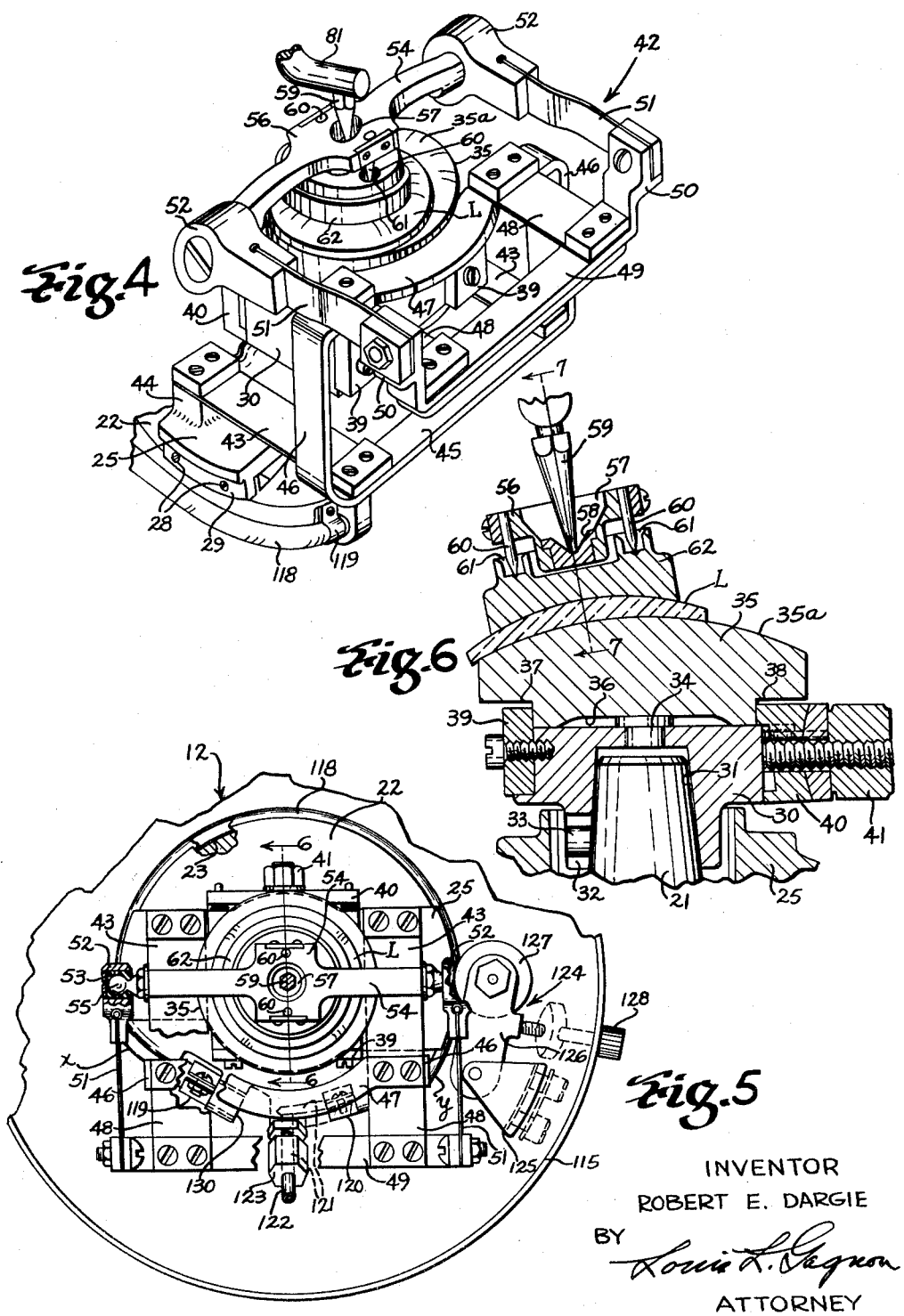

United States Patent Office 2,916,857
Patented Dec. 15, 1959

2,916,857

LENS SURFACING MACHINES

Robert E. Dargie, Southbridge, Mass., assignor to American Optical Company, Southbridge, Mass., a voluntary association of Massachusetts Application February 14, 1958, Serial No. 715,264

9 Claims. (Cl. 51—124)

This invention relates to improvements in grinding and polishing machines and has particular reference to a device for surfacing articles such as lenses or the like.

In the manufacture of optical lenses, particularly of the type embodying more or less complex surface shapes, considerable difficulty has been encountered heretofore in providing relatively simple and economical means for rapidly and efficiently producing complex optical surfaces on lenses or the like, which surfaces are free from the usual deformations such as drag lines or waves.

One of the major problems encountered in producing toric lens surfaces or compound surface curvatures has been the difficulty encountered in maintaining the major axes of the surfacing tool being used in accurately aligned relation, at all times, with the article being surfaced while simultaneously introducing compound motions between the tool and article which motions will produce an abrading or polishing action to the article without introducing drag lines, waves or other deformations on the finished optical surface.

In attempting to overcome the well-known problems of surfacing toric lenses, many complicated, expensive and intricate mechanical arrangements have been devised which require special skills to operate and which, particularly due to their complicated and expensive nature, are not practical for use in instances where short run or relatively infrequent operations are conducted.

It is, therefore, a principal object of this invention to provide relatively simple and inexpensive lens surfacing apparatus which may be readily adapted to accurately abrade or polish either simple or complex lens surface curvatures.

Another object is to provide, in lens surfacing apparatus of the above character, novel resilient axis aligning means for supporting an article to be abraded in precise axially aligned relation with a tool or forming member on said apparatus and improved means for simultaneously actuating the article and forming member to produce a desired surface effect on said article.

Another object is to provide apparatus of the above nature with a portion thereof functioning as pump means for intermittently applying a liquified abrading medium or the like to an article being surfaced by said apparatus.

Another object is to provide, in a device of the above character, means for simultaneously introducing a unique combination of motions to an article being abraded and its respective tool or forming member so as to cause the entire surface of said article to be evenly and rapidly surfaced without allowing a given point on either said tool or article to travel twice in the same path during any normal surfacing operation.

A further object is to provide a lens surfacing machine capable of producing superior optical lens surfaces either of a simple or complex nature which machine accomplishes at least all of the features of the more complicated and expensive conventional lens surfacing machines and is extremely economical to manufacture, simple to operate and highly efficient in use.

Other objects and advantages of the invention will become apparent from the following description when taken in conjunction with the accompanying drawings in which:

Fig. 2 is a vertical cross-sectional view taken generally along line 2—2 of Fig. 1 with parts of the device shown at different levels for ease of illustration;

Fig. 4 is a perspective view of an aligning mechanism which forms a part of the device of the invention;

Fig. 5 is an enlarged fragmentary top plan view of a part of the device of the invention taken from a position indicated by line 5—5 of Fig. 2 and looking in the direction of the arrows;

Fig. 6 is an enlarged fragmentary cross-sectional view taken on line 6—6 of Fig. 5; and Fig. 7 is an enlarged fragmentary cross-sectional view taken on line 7—7 of Fig. 6 and looking in the direction indicated by the arrows.

Figure 1:
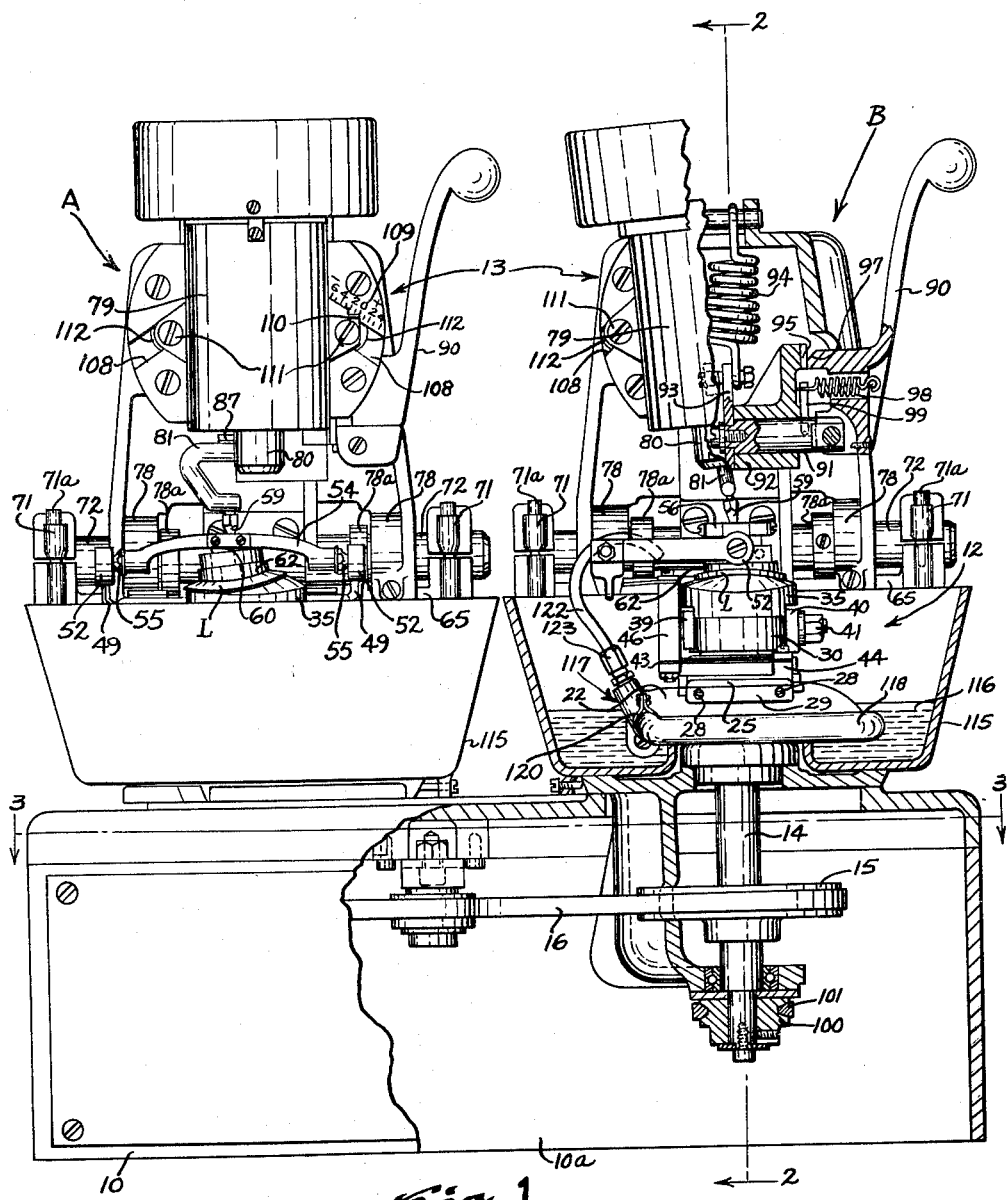
Fig. 1 is a front elevational view of the device of the invention with parts thereof broken away.

Referring more particularly to the drawings wherein like characters of reference designate like parts throughout the various views thereof, the device of the invention embodies a base 10 which encloses drive mechanism, generally indicated by numberal 11, for simultaneously operating a pair of surfacing units A and B, each of which are mounted on the base 10 and are operatively interconnected with the drive mechanism 11.

The units A and B are identical in construction and each comprise two major parts, namely a rotatable abrading section 12 including means for aligning and supporting an article, such as a lens blank or the like L, to be abraded and/or polished and an oscillating head part 13 adapted to be operatively associated with the abrading section 12 during the performance of an abrading or polishing operation.

It will become apparent from the description to follow that the units A and B may be operated singularly or simultaneously to individually perform similar lens surfacing operations or, alternatively, they may be arranged to simultaneously perform two different surfacing operations.

Since the units A and B are identical in construction, emphasis will be placed upon the description of unit B, which is illustrated in greater detail throughout the drawings, and the same reference numerals will be applied to like parts of both of the units A and B.

Referring more particularly to the surfacing unit B of the apparatus shown in the drawings, there is provided, in the abrading section 12 thereof, a vertically extending drive shaft 14 which is journaled in the base 10. The lower end of the shaft 14 extends downwardly into the hollow interior 10a of the base 10 and is provided with a fixed drive pulley 15 which is driven by a belt 16 and pulley 17 connection with an electric motor or the like 18. The upper end of the shaft 14 is provided with an adaptor 19 to which is secured a shouldered mounting member 20 having a tapered upper end 21 axially aligned with the longitudinal axis of the shaft 14. On the shouldered part of the member 20 there is mounted a disc 22 which is bolted or otherwise secured to the member 20 (Fig. 2). The disc 22 is provided with a centrally aligned circular opening through which the tapered part 21 of the member 20 extends and a depending flanged edge part 24 which is provided with an annular channel 23 used to form a part of a fluid abrasive pump mechanism to be described in greater detail hereinafter.

A plate 25 having a centrally aligned circular opening therethrough and a circular counterbore 26 on its underside is positioned on the upper surface of the disc 22 in interfitting relation with a raised circular shouldered part 27 on the disc 22 which is adapted to mate with the counterbore 26. The shouldered part 27 of the disc 22 is formed concentric with the central opening through the disc 22 and thus allows the plate 25 to be revolved about its central axis which is coincident with the axis of rotation of the shaft 14. Set screws 28 are provided in each of the depending parts 29 of the plate 25 to lock the same in a desired adjusted relation with the disc 22 in the manner illustrated in Figs. 1 and 2.

An adaptor 30 (Figs. 1, 2 and 6) having a centrally disposed tapered bore 31 opening outwardly at its underneath side, is fitted over the tapered end 21 of the member 20 and is keyed to the member 20 by means of a slot 32 in its lower side wall and a protruding snug fitting locating pin 33 in the end 21 of the member 20 (see Fig. 6). The adaptor 30 is further provided with a protruding pin 34 on its upper surface which is axially aligned with the central axis of the tapered bore 31 therein and consequently aligned with the axis of rotation of the shaft 14 when the adaptor 30 is mounted on the member 20 as disclosed above. The pin 34 functions to provide a reference means for aiding in aligning the central axis of a lens blank forming tool or lap 35 with the axis of rotation of the shaft 14 when the lap 35 is placed on the adaptor 30 as shown in Figs. 1, 2 and 6. In this respect, the lap 35 is provided with a transverse slot 36 on its under side which is in intersecting relation with its central axis and of a width substantially equal to the diameter of the protruding head part of the pin 34. The lap 35 is also provided with a pair of accurately machined flat parallel side parts 37 and 38 which extend in a direction normal to the direction of the slot 36. Each of the flats 37 and 38 are equally spaced from the central axis of the lap 35 and the adaptor 30 is provided with a locating plate 39 fixed to one side thereof which protrudes above its upper surface so as to be engaged by the flat 37 of the lap 35 when the lap 35 is placed on the adaptor 30 in the manner shown more clearly in Fig. 6. The distance between the central axis of the adaptor 30 and the inner side of its plate 39 is controlled to be substantially equal to the distance from the central axis of the lap 35 to its flat side part 37 so that by placing the lap 35 on the adaptor 30 with its slot 36 in interfitting relation with the head part of pin 34 and its flat side in engaging relation with plate 39 the central axis of the lap 35 will be substantially coincident with the axis of rotation of the shaft 14. A clamp member 40 is provided on the adaptor 30 to engage the flat side 38 of the lap 35 and when tightened by a locking nut 41 the lap 35 will be securely fastened in accurately aligned relation with the adaptor 30 so as to rotate therewith by the operation of the shaft 14.

It will be noted from Figs. 1, 2, 4 and 5 that means in the form of a flexible harness arrangement, generally indicated by reference numeral 42, is provided on the abrading section 12 of the device of the invention to align and maintain a blocked lens blank L in aligned abrading relation with the lap 35.

In forming toric surfaces on lens blanks, the surface 35a of the lap 35 is accurately formed to the precise curvatures which are to be reproduced on the adjacent surface of a lens blank. That is to say, if a concave or negative toric surface is to be produced on a lens blank L, a convex or plus toric surface 35a of the combined curvatures desired is provided on the lap 35. However, if a convex or plus toric surface is to be produced on a lens blank, the lap will be provided with a concave or negative toric surface simulating that which is to be produced on the lens blank. In the drawings, there is illustrated means for forming a concave or negative toric surface on the lens blank L.

The harness arrangement 42 of the invention is adapted to maintain the blocked lens blank L in predetermined aligned relation with the major and minor axes of the toric surface 35a of the lap 35 at all times during a surfacing operation and comprises a first pair of flat spring members 43 (Figs. 4 and 5) which are secured at one end to a pair of machined bosses 44 integrally formed on the above mentioned plate 25. It can be seen that the spring members 43 straddle the lap carrying apparatus and are secured at their opposite ends to a relatively rigid U-shaped spanning member 45. The member 45 is provided with end parts 46 which extend upwardly approximately to the level of the surface 35a of the lap 35 and are turned inwardly toward each other and are interconnected by a relatively rigid reinforcing member 47. On each of the in-turned ends of the spanning member 45 there is fixed one end of a second pair of relatively short flat spring members 48 which extend in parallel relation with each other further outwardly away from the lap 35 in the direction of the first mentioned spring members 43 and are secured at their opposite ends by a second relatively rigid spanning member 49 having upturned end parts 50. To each of the end parts 50 of the member 49, there is securely fastened one of a third pair of flat spring members 51 which are disposed with their sides of greatest width in a vertical direction. That is, substantially normal to the sides of greatest width of the spring members 43. The spring members 51 extend forwardly, or in a direction toward the lap 35 and are each provided with an attached end part 52 at their free ends. The parts 52 are each provided with an internal ball-type socket 53 preferably formed of a resilient rubber-like material such as illustrated in Fig. 5 and the combined spring members 51 and parts 52 are so controlled in length as to cause an axis extending between the respective sockets 53 to pass through or intersect the central axis of the lap 35, which, it will be remembered, is coincident with the axis of rotation of drive shaft 14.

Extending between the end parts 52 is a yoke 54 having a ball-like connecting member 55 at each end thereof which is interfitted with a respective socket 53 so as to form a universal connection between the yoke and the spring members 51. Midway between its ends, the yoke 54 is provided with an enlarged part 56 having a centrally disposed cavity 57 therein with a conically recessed seat member 58 (Fig. 6) at the bottom of said recess. The seat member 58 is preferably formed of a hardened steel or the like to resist wear and is adapted to receive a drive pin 59 in the manner illustrated more clearly in Fig. 6. The drive pin 59 is a part of the head 13 mechanism of the device of the invention and functions to actuate the yoke 54 and harness arrangement to ultimately cause the lens blank L to be moved over the forming surface 35a of the lap 35 in a manner to be subsequently described in detail.

The enlarged part 56 of the yoke 54 is also provided with a pair of depending pin members 60 which are disposed along an axis normal to and intersecting the longitudinal axis of the yoke 54 and the pin members 60 are adapted to fit into a pair of respective socket-like recesses 61 which are provided in a block 62 upon which the lens blank L is mounted.

The lens blank L is initially aligned relative to the block 62 and mounted thereon in a conventional manner which is well known in the art of blocking toric lens blanks. In this regard, the lens blank is first marked to indicate the direction in which at least one of the major axes of the toric surface to be applied thereto will extend and the block is placed on the side of the lens blank opposite its side to be surfaced with the socket-like recesses 61 therein aligned parallel relation with one of said major axes. With the socket-like recesses 61 of the block in parallel aligned relation with the location at which one of the major axes of the toric surface is to be applied to the lens blank, the blocked lens blank is placed on the lap 35 in the manner illustrated throughout the figures of the drawings and the pin members 60 of the yoke 54 are placed in the socket-like recesses 61 of the block. If the axis extending through the pin-like members 60 is, for any reason, not aligned parallel with a predetermined major axis of the curvature provided on surface 35a of the lap 35, the entire harness arrangement 42 may be rotated about the central axis of the lap 35 (which is the axis of rotation of the shaft 14) by loosening the set screws 28 of the plate member 25 and rotating the same until the axis of the pin members 60 becomes precisely aligned in parallel relation with a selected major axis of the surface 35a of the lap 35 whereupon the screws 28 are again tightened to permanently retain this alignment.

It is pointed out that the above adjustment of the harness arrangement 42 need only be performed once to initially align the apparatus since the blocked lens blank may be replaced any number of times and at each replacement the blocked lens blank will automatically become precisely axially aligned with the block 62 when the pin members 60 are located in the recesses 61 of the respective blocks (provided of course all lenses are identically blocked). Furthermore, it should be apparent from the above description of Fig. 6 that by providing laps 35 which all have one of their major axes of surface curvature aligned parallel with their respective locating slots 36 or their respective flat side parts 37 and 38, replacement of the laps will not disturb the alignment of the apparatus.

In order to abrade or polish the surface of a lens blank L it is necessary to apply an abrasive medium between the adjacent surfaces of the lens blank L and the lap 35 and cause the lens blank to travel or be continually moved over the surface 35a of the lap 35. The movement of the lens blank L relative to the lap 35 is accomplished by the drive pin 59 which was said to be actuated by the head 13 mechanism of the device of the invention.

Prior to the explanation of the details regarding the head part 13 of the device, it should be clearly understood that due to the unique arrangement of the spring members 43, 48 and 51 and the other parts of the harness arrangement 42, the lens blank L and its respective block 62 may be moved across the surface 35a of the lap 35 in any direction or to any extent without causing any misalignment of the parallel relationship of the major axes of the lens blank L with respect to the major axes of the surface curvature 35a. Spring members 51 will flex only in a horizontal direction to permit sidewise motion of the yoke 54 which is universally connected at its ends to said springs 51 and the combined action of spring members 43 and 48 which will flex only in a vertical direction will allow the motion necessary to move the yoke fore and aft as well as to compensate for any up and down motion which inherently takes place when the lens blank L rides over the incline of the curvature of surface 35a of the lap 35. With the combined action of springs 43, 48 and 51 and the ball 55 and socket 53 connections on the yoke 54, the above mentioned axial relationship between the lens blank being surfaced and the forming surface of the lap is never disturbed during operation of the device of the invention.

It was pointed out previously that the drive shaft 14 is rotated during a surfacing operation and it can be seen that the entire apparatus including the disc 22, plate 25, adaptor 30, lap 35, harness arrangement 42 and blocked lens will rotate in unison to introduce a first motion which in combination with those imparted by the head 13 will together produce a continually changing path of travel between the lens blank L and the lap 35.

The entire head part 13 is pivotally mounted on the base 10 by means of a bracket member 65 which is secured by a set screw or the like 66 to the upper end of a vertically extending rotatable shaft 67 journaled in the base 10. The under side of the bracket 65 rests on a thrust bearing or the like 68 fixed within a mounting plate 69 which is bolted to a raised part 70 of the upper surface of the base 10. The bearing 68 functions to support the weight of the head part 13 while simultaneously permitting it to swing and the shaft 67 to rotate freely on the base 10.

The opposed outer ends of the bracket 65 are each provided with split clamping members 71 (see Fig. 1) and a spindle 72 extends between the members 71 transversely in a direction normal to the longitudinal axis of the shaft 67. The spindle 72 is clamped to the bracket 65 adjacent its outer ends by means of clamp screws 71a (Fig. 1) and passes freely through a bore 73 in a part 74 of the bracket 65, see Fig. 2, which is of increased cross-sectional area and disposed substantially midway between the members 71 thereof. A forwardly extending bracket arm 75 is bolted or otherwise rigidly secured to the part 74 of the bracket 65 and carries operating means, generally indicated by the reference numeral 76, for raising or lowering the remaining part of the head 13 relative to the abrading section 12 of the device in a manner to be discussed hereinafter.

The remaining part of head 13 consists of a large forwardly directed overhanging arm member 77 pivotally mounted on the spindle 72 by means of integrally formed bearing parts 78 and a pair of adjustable spacer rings 78a (Fig. 1) which are clamped to the spindle 72 by set screws or the like. The rings 78a are positioned against the inner sides of their respective bearing parts 78 to prevent the arm member 77 from sliding sidewise on the spindle 72. On the forward end of the arm 77 there is provided a tiltable end part 79 having a rotatable spindle 80 journaled therein. The lower end of the spindle 80 is provided with an adjustable eccentric crank arm 81 to which is attached the previously mentioned drive pin 59. The uppermost end of the spindle 80 is provided with a pulley 82 which is driven by a belt 83 and pulley 84 on the drive spindle of an electric motor 85. The motor 85 is directly mounted on the rear side of the arm 77 and in addition to driving the spindle 80, its weight serves to counterbalance the weight of the forward part of the arm 77.

With the head 13 in the position illustrated in Figs. 1 and 2 of the drawings it can be seen that by actuating the motor 85 the spindle 80 will rotate and the drive pin 59 which is offset relative to the axis of rotation of the spindle 80 will cause the blocked lens blank to describe a circular path relative to the surface 35a of the lap 35. The size or radius of the circular path however may be controlled by the extent to which the eccentric crank arm 81 is adjusted in the spindle 80. The eccentric crank arm 81 is passed through an opening 86 in the spindle 80 and is prevented from rotating sidewise therein by a key or the like 87. When the crank arm 81 is adjusted to cause the drive pin to be offset relative to the axis of rotation of the spindle 80 a desired amount, a lock screw 88 is tightened to clamp the crank arm 81 securely in its desired adjusted relationship with the spindle 80. The eccentricity of the drive pin 59 should be controlled to allow the lens blank L to travel in a circular path which is such as to permit its edge parts to approach and ride over the edges of the lap 35 approximately 4 millimeters. This slight overhang of the lens blank serves to insure an even wear on the lap 35 and thereby produces a more accurate surface curvature on the surfaced lens blank.

During a lens surfacing operation, there must be a controlled pressure applied to a lens blank being abraded to cause the abrasive material, which is applied between the lens blank and the forming surface of the tool or lap, to bite into and cause an abrasion of the surface of the lens blank being abraded. The extent of pressure is controlled in accordance with the speed at which the lap and/or lens blank are moved relative to each other and the type or coarseness of the abrasive material being used.

In the present invention the actuating means 76 for raising or lowering the head 13 is adapted to perform a further function of providing means for controlling the pressure applied to the lens blank L and comprises an operating handle 90 (Figs. 1 and 2) pivotally connected to one end of a stub shaft 91 which is journaled in a bearing part 92 of the bracket arm 75. The opposite end of the shaft 91 is provided with a lever member 93 which is adapted to move up and down when the shaft 91 is rotated by the handle 90. A relatively large and rigid coil spring 94 is connected at its lowermost end, to the lever member 93 and at its upper end, to the large overhanging arm 77 in the manner illustrated in Figs. 1 and 2 so that rotation of the stub shaft 91 in one direction, by operation of the handle 90, will cause the arm 77 to be pulled downwardly by the spring 94 and the drive pin 59 to engage the yoke 54 whereas rotation of the stub shaft 91 in the opposite direction will cause the spring 94 to contract and form a rigid link between the lever 93 and arm 77 to force the arm 77 upwardly thus lifting the drive pin 59 away from the yoke 54.

With the arm 77 moved downwardly to the point where the drive pin engages the seat 58 in the yoke 54, a controlled pressure may be applied to the lens blank L by continuing the rotation of the stub shaft 91 so as to extend the spring 94 a controlled amount in accordance with the pressure desired to be applied to the lens blank L. On the bracket arm 75 there is provided a ratchet plate 95 (Figs. 1 and 2) which is provided with a plurality of radially disposed slotted recesses 96 adapted to be engaged by an interfitting tooth-like ratchet projection 97 formed integrally with the handle 90 (Fig. 1). A spring 98 having one end attached to a pin 99 which is fixed in the stub shaft 91, and its opposite end secured to the handle 90, is provided to draw the projection 97 on the handle 90 into a selected one of the recesses 96 and thus retain the large spring 94 in a desired extended condition during a surfacing operation. When it is desired to readjust the extended condition of the spring 94 or to raise the arm 77 as mentioned above, the handle 90 is simply pulled sidewise against the tension of the spring 98 to remove the projection 97 from engagement with a recess 96 and the handle 90 is rotated to another desired position of use whereupon the projection 97 thereof is allowed to engage another of the recesses 96 or, if desired, a recess 96a (see Fig. 2) which is so located as to hold the arm 77 of head 13 in a raised position away from the abrading section 12 of the device.

Thus far, means has been described for producing two different motions to the lens blank L and lap 35, one being a simultaneous rotary motion to both the lens blank and lap produced by operation of the drive shaft 14 and the other a circular motion to the lens blank produced by operation of the spindle 80 and eccentric crank arm 81.

At this point, a third motion will be described which embodies oscillating the lens blank L sidewise across the lap 35 simultaneously with the first two motions. The oscillating motion is brought about by causing the entire head part 13 of the device to continually swing back and forth in a sidewise direction by means of the shaft 67 which was said to be fixed to the mounting bracket 65 of the head 13.

The drive means (Figs. 2 and 3) for oscillating the shaft 67 comprises a pulley 100 which is keyed or otherwise fixed to the lowermost end of the drive shaft 14 and a belt 101 connecting the pulley 100 with a second pulley 102 on the lowermost end of an eccentric mechanism 103. The eccentric mechanism 103 embodies a vertical shaft 104 journaled in the base 10 and having at its upper end, an adjustable lever arm 105 which is pivotally attached, at one end, to the shaft 104 in offset or eccentric relation with the axis of rotation of the shaft 104. The other end of the lever arm 105 (see Fig. 3) is pivotally attached to a rigid drive arm 106 which extends between the lever arm 105 and the shaft 67 and is securely clamped to said shaft 67.

Figure 3:
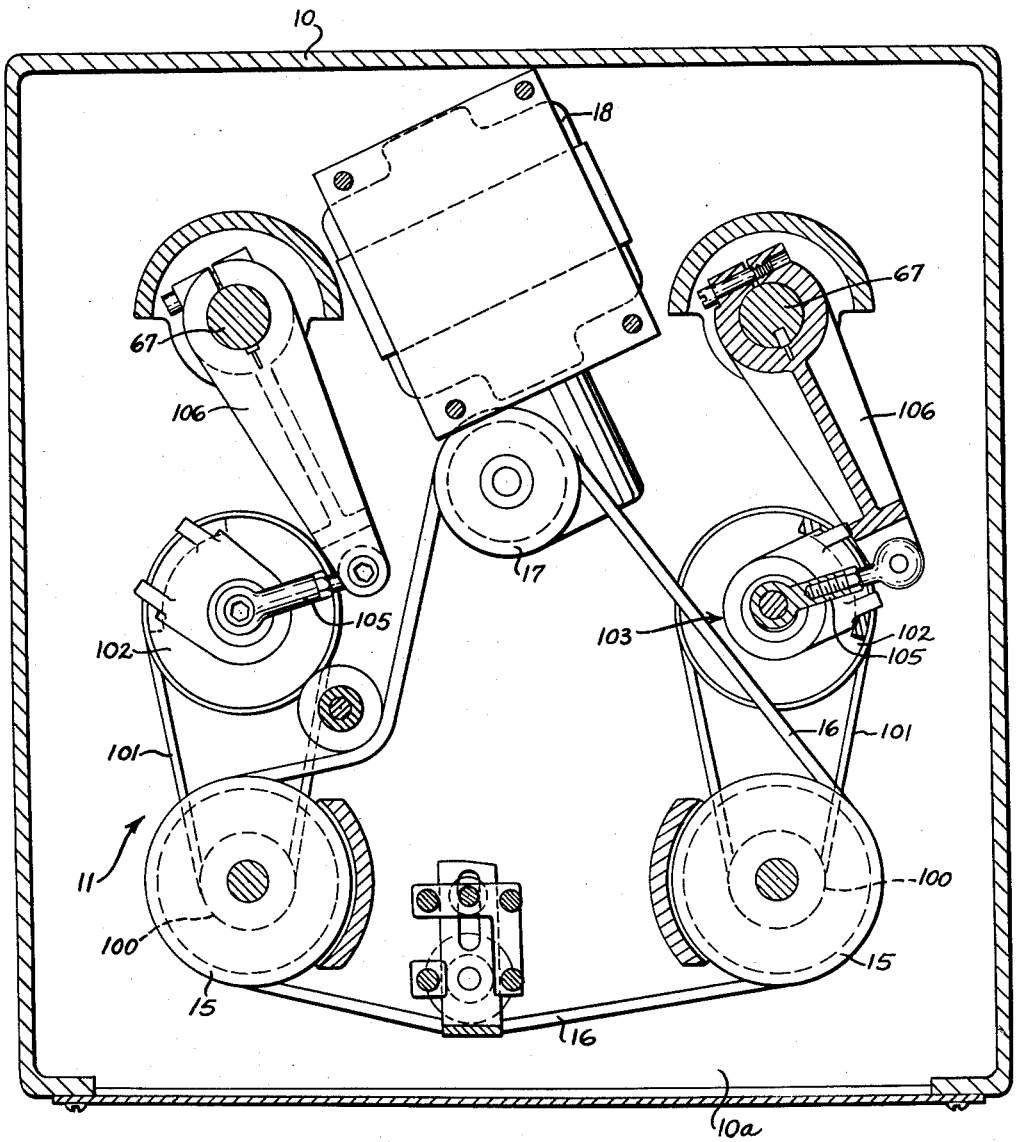
Fig. 3 is a horizontal cross-sectional view taken substantially on line 3—3 of Fig. 1.

It can be seen that when the drive shaft 14 is rotated by the motor 18 as described above, the drive arm 106 will be oscillated sidewise by the mechanism just described, an amount, or to an extent, in accordance with the eccentricity of the connection between the lever arm 105 and the shaft 104. This is controlled in the assembly of the device to cause a lens blank to oscillate sidewise over a predetermined path in accordance with the size of lap being used. In order to initially set the head 13 relative to the lap 35 so as to prevent the oscillation thereof from moving the lens blank too far in one direction and not far enough in the opposite direction, the lever arm 105 is made adjustable in length as can be seen in Fig. 3 so that by lengthening or shortening the lever arm 105 the head 13 may be easily adjusted to a starting position whereby the edges of the lens blank will ride over the edges of lap 35 not more than approximately 4 millimeters.

If it is found that the extent of adjustment of the lever arm 105 is not adequate to prevent the edges of the lens blank from riding too far over the edges of the lap 35 or if a condition exists where the edges of the lens blank do not ride over the edges of the lap 35 far enough (approximately 4 millimeters), the entire arm member 77 of the head may be adjusted sidewise on the spindle 72 by loosening the set screws in the spacer rings 78a and sliding the arm member 77 in the required direction along the spindle 72. When properly adjusted, the spacer rings 78a are again placed against the inner sides of their respective bearing parts 78 and the set screws are tightened. It is pointed out that the above adjustments are only made to initially set-up the device of the invention and that if lens blanks which are all of approximately the same diameter or outer contour size are to be surfaced with the same lap or other laps which are identical in contour size and shape, no further adjustment of the device is necessary.

As shown best in Fig. 1 the forward end 79 of the arm member 77 is adjustably mounted in a pair of guide ways 108 provided on the arm member 77 so as to be tiltable relative to the arm member 77. This allows the drive pin 59 to be directed toward the curved surface 35a of the lap 35 along an axis which is approximately normal to a tangent of said curved surface at the point of intersection of the axis of the drive pin 59 and the curved surface 35a. By so adjusting the drive pin 59, the path of travel of the drive pin 59 is in a plane tangent to the curve of the lap. This aids in providing an even abrasion of the lens blank being surfaced by preventing excessive abrasion of one side or the other of the lens blank.

A scale 109 and pointer 110 (Fig. 1) is provided on the part 79 wihch indicates the extent to which the part 79 should be tilted for various lap curvatures which might be used in the trade. By loosening the pair of screws 111 which are associated with gibs 112 in the guideways 108, the part 79 may be freely tilted to a desired position of use, whereupon the screws 111 are tightened to securely clamp the part 79 in said position.

In order to surface a lens blank with the device of this invention, it is necessary, as pointed out hereinabove, to supply an abrasive material between the lens blank and lap. For grinding purposes, the abrasive material is in the form of an emery grit or the like suspended in a vehicle such as water or the like and the grit size is selected in accordance with the surface texture desired to be produced on the lens blank and/or the desired rate at which the removal of glass is to take place. In a polishing operation, the abrasive material is in the form of a conventional polishing medium such as rouge or cerium oxide or the like which is suspended in a vehicle of water or the like. Furthermore, a relatively thin conventional polishing pad of fabric, plastic or the like would be secured in covering relation with the forming surface 35a of the lap in the conventional manner during a polishing operation.

Heretofore, many complicated, expensive and relatively inefficient devices have been provided for supplying abrasive materials of the above character to articles being surfaced and it is a particular feature of this invention to provide a simple and inexpensive highly efficient abrasive supplying means which is relatively non-clogging and may be quickly and easily disassembled for cleaning purposes.

The abrasive supply means of the invention comprises a circular pan member 115 removably secured to the upper surface of the base 10 and in encircling relation with the abrading section 12 of the device (Figs. 1, 2 and 5). A supply of liquid abrasive medium 116 is provided in the pan 115 as shown in Fig. 1 and a pump mechanism 117 which includes the disc 22 mentioned hereinabove is provided to lift the abrasive medium from the pan 115 and apply the same, at intervals, to the surface 35a of the lap 35. The pump mechanism comprises a flexible hose 118 placed in the annular channel 23 of the disc 22 and extending peripherally around the outer side part of the depending flange 24 thereof. The ends of the hose 118 are each secured to the disc 22 in closely spaced relation with each other as shown in Fig. 5. One of the ends of the hose 118 is secured to the disc 22 by a clamp 119 in such a manner as to allow passage of the abrasive medium therethrough and to allow its open end to be submerged in the abrasive medium at all times. The other end of the hose 118 is attached to the disc 22 by another clamp 120 similar to clamp 119 which connects said other end of the hose 118 with an enlarged integral part of the disc 22. The enlarged integral part is provided with channels 121 with which the hose 118 communicates and which lead to a delivery tube 122 which is coupled to the disc 22 by a connector 123. The tube 122 is directed upwardly and over the parts 49 and 47 of the harness arrangement 42 with its open end disposed over the forming surface 35a of the lap 35. A roller 127 carried by adjustable roller supporting mechanism 124 attached to the inner side of the pan 115 is provided to engage the hose 118 and force it against the walls of the channel 23 in the disc 22 as shown in Figs. 2 and 5. The roller mechanism comprises a mounting bracket 125 which is bolted or otherwise secured to the inner side surface of the pan 115 and has an arm 126 pivotally connected at one of its ends to the bracket 125 and has the roller 127 pivotally connected to its other end. An adjusting screw 128 (Fig. 5) is threaded through the side of the pan 115 and engages the arm 126 at a location intermediate its end parts. By threading the screw 128 inwardly toward the arm 126 the roller is forced against the hose 118. It is preferable to adjust the roller 127 to a position where it will act to completely collapse or close the opening through the hose without exerting an excessive pressure against the disc 22. In Fig. 5, it can be seen that while the disc 22 is generally circular in shape, the side thereof at which the ends of the hose 118 are connected is somewhat flattened to allow the two ends of the hose 118 to pass the roller 127 without being engaged thereby when the disc 22 is rotated. It is pointed out that the same driving mechanism for the rotation of the tool is utilized to rotate the disc 22. During rotation of the disc 22 in a counterclockwise direction as viewed in Fig. 5, the fluid abrasive medium 116 will enter the open end 130 of the hose 118 during the time the roller 127 passes over the flattened side thereof and when the hose 118 is again engaged by the roller 127 at point X, the hose will be collapsed, thus forcing the abrasive medium ahead of the roller while simultaneously drawing in more abrasive medium through the open end 130 of the hose 118 which is now behind the roller. As the counterclockwise rotation of the disc 22 is continued, the abrasive medium 116, which is forced through the hose 118 ahead of the roller 127, will be caused to flow up through the channels 121 and tube 122 and be ejected at the upper end of the tube 122 onto the surface 35a of the lap 35. After the part of the hose 118 which is indicated by the reference y passes beyond the roller 127, the hose is no longer in contact with the roller 127 and during the interval of time required for the point X on the hose 118 to again make contact with the roller 127, the hose 118 becomes filled with the abrasive medium and the pumping operation is repeated. It can be seen that the continuous rotation of the disc 22 by operation of the drive shaft 14 during an abrading operation will cause the abrasive pump mechanism to intermittently supply the abrasive material to the abrading surface of the lap 35a in amounts which may be controlled in accordance with the capacity of the opening through the hose 118. That is to say, hoses having larger or smaller internal bores may be placed on the disc 22 so as to cause greater or lesser amounts, respectively, of abrasive medium to be intermittently supplied to the lap 35. It is pointed out that the hose 118 may be quickly and simply removed from the disc 22 by releasing the clamps 119 and 120 for cleaning or replacement purposes. Furthermore, the abrasive action of the abrading fluid which is detrimental to conventional pump mechanism can cause no appreciable damage to the pump means of the invention other than to produce wear on the hose 118 which is an extremely inexpensive part and may be readily replaced if necessary.

Although the above description has dealt primarily with the surfacing of toric lens blanks, it is to be understood that spherical lens blanks may be equally as well surfaced with the device of the invention by replacing the lap 35 with a similarly shaped lap having a spherical forming surface curvature thereon. Since in surfacing spherical lens blanks there is no requirement for axis aligning means, the harness arrangement 42 is simply removed from the plate 25 and the drive pin 59 is directly engaged in the block on which a spherical lens blank is mounted. Otherwise, the surfacing of the spherical lens blank will follow the procedure disclosed above for lens blank L.

In instances where unusually steep curvatures are to be surfaced on lens blanks, such as curvatures of 12 or more diopters, it is preferable to follow a surfacing procedure known to the trade as "cap polishing" particularly when surfacing steeply curved convex surfaces on lens blanks with the use of a steeply curved concave lap. This is to avoid sidewise forces of unequal nature to be exerted on the lens blank being surfaced as would be the case if the blank was caused to ride up the steep sides of a steeply curved concave lap. In order to cap polish with the device of the invention the blocked lens blank is fixed to the adaptor 30 with its convex side facing upwardly and the concave lap is placed over the lens blank and supported in alignment therewith by the yoke part 54 of the harness arrangement 42. In essence, the lap 35 and the blocked lens blank L are simply inverted and the lap is caused to describe a circular path over the surface of the lens blank while simultaneously being oscillated in a sidewise direction.

From the foregoing, it can be seen that improved simplified and economical means has been provided for accomplishing all of the objects and advantages of the invention. However, it should be apparent that many changes in the details of construction and arrangement of parts may be made by those skilled in the art without departing from the spirit of the invention as expressed in the accompanying claims and the invention is not limited to the exact matters shown and described herein as only the preferred matters have been given by way of illustration.

Having described my invention, I claim:

1. In apparatus of the character described, the combination of a first holding means for supporting an article to be surfaced and a second holding means for supporting a forming member for shaping said article, actuating means for rotating one of said holding means about its central axis, and other actuating means associated with the other of said holding means for causing the same to be actuated in circular paths relative to said one of the holding means, oscillating means associated with said other holding means for causing the same to be oscillated transversely relative to said one of the holding means simultaneously with said actuation thereof in a circular path, resilient aligning means rotatable with said one of the holding means and associated with said other of the holding means for maintaining said article to be surfaced in predetermined axially aligned relation with said forming member during simultaneous actuation of both holding means, containing means for holding a supply of liquified abrasive medium and pump means having a stationary part and a part connected to rotate with said one of the holding means for intermittently applying a controlled amount of said medium to said article and forming member with each revolution of said one of the holding means.

2. A lens surfacing machine comprising a first holding means for supporting a lens blank to be surfaced and a second holding means for supporting a forming tool for shaping a surface of said lens blank, means for rotating said second holding means and tool about their central axis when said tool is applied to said second holding means, adjustable means associated with said first holding means for moving said lens blank into contact with said tool and applying a desired pressure thereto, actuating means associated with said first holding means for moving said lens blank in circular paths over the surface of said tool, oscillating means functioning simultaneously with said actuating means to introduce a transverse oscillating motion to said lens blank in combination with said circular motion, axis aligning means rotatable with second holding means and associated with said first holding means for maintaining said lens in predetermined axially aligned relation with said tool during actuation of said first and second holding means, means on said machine containing a supply of liquified abrasive medium and intermittently operating pumping means having a part connected to rotate with second holding means for delivering a predetermined quantity of said abrasive medium to the adjoining surfaces of said lens blank and tool with each rotation of said second holding means.

3. Apparatus for surfacing toric lenses comprising the combination of rotatable holding means for supporting a lens blank forming tool having a toric surface on one of its sides and means on its opposite side for attaching the same in fixed relation with said rotatable holding means, means for rotating said holding means, supporting means for positioning a lens blank to be surfaced in overlying engaging relation with said tool, resilient axis aligning means connecting said supporting means with said holding means and rotatable with said holding means for maintaining said lens blank in predetermined aligned relation with a major axis of said toric surface on said tool at all times during the operation of said apparatus, eccentric means connected with said supporting means and operable to cause said supporting means and lens blank when supported thereby to travel over the toric surface of said tool in circular paths, oscillating means associated with said supporting means for moving said lens blank across said toric surface simultaneously with the movement produced by said eccentric means, means containing a supply of liquified abrasive medium on said apparatus and dispensing means having a part connected with and rotatable with said holding means intermittently operated to supply the toric surface of said tool and the surface being abraded of said lens blank with predetermined amounts of said abrasive medium at predetermined intervals during the operation of said apparatus.

4. A lens surfacing machine comprising the combination of a base, rotatable tool supporting means on said base for supporting a lens blank forming tool, means for rotating said tool supporting means, resilient lens blank holding means connected with said tool supporting means and rotatable therewith for supporting a lens blank to be surfaced in predetermined aligned relation with said lens blank forming tool when said tool is affixed to said tool supporting means, a head part on said machine pivotally supported on said base, rotatable eccentric means on said head part adapted to engage said lens blank holding means and, when actuated, cause said lens blank to travel in circular paths relative to said forming tool, adjustable means on said head part for moving said eccentric means into engagement with said lens blank holding means and causing a lens blank to be surfaced to engage said tool, further means functioning cooperatively with said adjustable means for applying and maintaining predetermined pressures on said lens blank during a surfacing operation, means for rotating said eccentric means and simultaneously acting means for oscillating said head part by pivoting the same on said base to cause said lens blank to be moved back and forth transversely over said tool while simultaneously being actuated to travel in said circular paths, a stationary container on said base for holding a supply of liquified abrading medium, intermittently acting pump means having a part connected to rotate with said tool supporting means for dispensing said medium in predetermined amounts on said tool and lens at predetermined intervals during a lens surfacing operation.

5. In apparatus of the character described, the combination of rotatable means for supporting a lens blank forming tool, means for rotating said tool, resilient axis aligning and supporting means for supporting a lens blank to be surfaced in engaging aligned relation with said tool, actuating means associated with said axis aligning and supporting means for introducing compound motions to a lens blank supported thereby, containing means on said apparatus for holding a supply of liquified abrasive medium and pump means rotatable with said rotatable means for supplying said medium to said lens blank and tool in predetermined amounts at predetermined intervals during the operation of said apparatus, said pump means comprising a circular supporting part fixed to said rotatable means and immersed in said medium, a collapsible tubular member in circumferentially encircling relation with said supporting part and fixed thereto, one end of said tubular member opening into said abrasive medium to allow said tubular member to become filled with said medium, a duct leading from the other end of said tubular member to a position adjacent said tool and lens blank supporting means and said ends of the tubular member being in circumferentially spaced relation to each other, stationary means on said apparatus in rolling contact with said tubular member for collapsing the same whereby said supporting part when rotated with said tool supporting means will cause said tubular member to pass by said stationary means and be progressively collapsed thereby along its length from its open end to said end connected to said duct, thus forcing said abrasive medium filling the same through said duct and onto said tool and lens blank being surfaced.

6. A lens surfacing machine comprising the combination of a base, rotatable tool supporting means on said base for supporting a lens blank forming tool, means for rotating said tool supporting means, resilient lens blank holding means connected with said tool supporting means and rotatable therewith for supporting a lens blank to be surfaced in predetermined aligned relation with said lens blank forming tool when said tool is affixed to said tool supporting means, a head part on said machine pivotally supported on said base, rotatable eccentric means on said head part adapted to engage said lens blank holding means and, when actuated, cause said lens blank to travel in circular paths relative to said forming tool, adjustable means on said head part for moving said eccentric means into engagement with said lens blank holding means and causing a lens blank to be surfaced to engage said tool, further means functioning cooperatively with said adjustable means for applying and maintaining predetermined pressures on said lens blank during a surfacing operation, means for rotating said eccentric means and simultaneously acting means for oscillating said head part by pivoting the same on said base to cause said lens blank to be moved back and forth transversely over said tool while simultaneously being actuated to travel in said circular paths, a stationary container on said base for holding a supply of liquified abrading medium, intermittently acting pump means comprising a circular member fixed to and rotatable with said tool supporting means, said circular member normally being immersed in said abrading medium, a collapsible hose member circumferentially encircling said circular member and attached thereto with one of its ends opening into said abrading medium to allow said medium to flow into said hose member, a tube connected to the other end of said hose member and leading to a position adjacent the engaged surfaces of said lens blank and tool, said other end of said hose member being slightly circumferentially spaced from the open end thereof and stationary means on said container in rolling contact with said hose member for collapsing the same whereby rotation of said circular member will cause the hose member to progressively pass by said stationary member and be collapsed thereby to force said medium in the hose member through said tube and onto said tool and lens blank.

7. A lens surfacing machine comprising the combination of a base, tool supporting means on said base rotatable about its longitudinal axis for supporting a lens blank forming tool, means for rotating said tool supporting means, resilient lens blank holding means connected with said tool supporting means and rotatable therewith for supporting a lens blank to be surfaced in predetermined aligned relation with said lens blank forming tool when said tool is affixed to said tool supporting means, said lens blank holding means embodying a first pair of flexible arms each having one end attached to said tool supporting means and adapted to flex only in the direction of the longitudinal axis of said tool supporting means, a first rigid connecting means attached to the other ends of said first pair of arms and spanning the space therebetween, said connecting means having upwardly directed end parts with a second rigid connecting means therebetween, a second pair of flexible arms each having one of their ends attached to one of the opposed ends of said second rigid connecting means, a third rigid connecting means attached to the other ends of said second pair of said flexible arms and spanning the space therebetween, said second pair of arms also being flexible only in the direction of the longitudinal axis of said tool supporting means, said third rigid connecting means having upwardly directed end parts, a third pair of flexible arms each having one of their ends attached to a respective one of said upwardly directed end parts of said third rigid connecting means, said third pair of flexible arms being flexible only in directions normal to the longitudinal axis of said tool supporting means, a yoke member extending between the other ends of said third pair of flexible arms and having its opposed ends universally connected to the respective ends of said third pair of flexible arms, a block having a lens blank to be surfaced mounted thereon, means on said yoke for universally connecting said block thereto, a head part on said machine pivotally supported on said base, rotatable eccentric means on said head part adapted to engage said lens blank holding means and, when actuated, cause said lens to travel in circular paths relative to said forming tool, adjustable means on said head part for moving said eccentric means into engagement with said lens blank holding means and causing a lens blank to be surfaced to engage said tool, further means functioning cooperatively with said adjustable means for applying and maintaining predetermined pressures on said lens blank during a surfacing operation, means for rotating said eccentric means and simultaneously acting means for oscillating said head part by pivoting the same on said base to cause said lens blank to be moved back and forth, transversely over said tool while simultaneously being actuated to travel in said circular paths, a stationary container on said base for holding a supply of liquified abrading medium, intermittently acting pump means having a part connected to rotate with said tool supporting means for dispensing said medium in predetermined amounts on said tool and lens blank at predetermined intervals during a lens blank surfacing operation.

8. Lens surfacing apparatus comprising the combination of a base, rotatable tool supporting means on said base for supporting a lens blank forming tool, means for rotating said tool supporting means, lens blank holding means for supporting a blocked lens blank to be surfaced in predetermined aligned relation with said lens blank forming tool when said tool is affixed to said tool supporting means, said lens blank holding means embodying a yoke connected to a block having a lens blank to be surfaced mounted thereon, resilient aligning means connecting said yoke with said tool supporting means and rotatable therewith, a part of said aligning means being adapted to flex only in a direction parallel to the longitudinal axis of said tool supporting means and another part of said aligning means being adapted to flex only in a direction normal to said longitudinal axis of said tool supporting means whereby said yoke and lens blank to be surfaced will be maintained precisely in a predetermined aligned relation with said tool at all times during the operation of said apparatus, a head part on said apparatus pivotally supported on said base, rotatable eccentric means on said head part adapted to engage said yoke part of said lens blank holding means and, when actuated, cause said lens blank to travel in circular paths relative to said forming tool, adjustable means on said head part for moving said eccentric means into engagement with said yoke part of said lens blank holding means and causing a lens blank being surfaced to engage said tool, further means functioning cooperatively with said adjustable means for applying and maintaining predetermined pressures on said lens blank during a surfacing operation, means for rotating said eccentric means and simultaneously acting means for oscillating said head part by pivoting the same on said base to cause said lens blank to be moved back and forth, transversely over said tool while simultaneously being actuated to travel in said circular paths, a stationary container on said base for holding a supply of liquified abrading medium, intermittently acting pump means having a part connected to rotate with said tool supporting means for dispensing said medium in predetermined amounts on said tool and lens blank at predetermined intervals during a lens blank surfacing operation.

9. Lens surfacing apparatus comprising the combination of a base, tool supporting means on said base rotatable about its longitudinal axis for supporting a lens blank forming tool, means for rotating said tool supporting means, resilient lens blank holding means connected with said tool supporting means and rotatable therewith for supporting a lens blank to be surfaced in predetermined aligned relation with said lens blank forming tool when said tool is affixed to said tool supporting means, said lens blank holding means embodying a first pair of flexible arms each having one end attached to said tool supporting means and adapted to flex only in the direction of the longitudinal axis of said tool supporting means, a first rigid connecting means attached to the other ends of said first pair of arms and spanning the space therebetween, said connecting means having upwardly directed end parts with a second rigid connecting means therebetween, a second pair of flexible arms each having one of their ends attached to one of the opposed ends of said second rigid connecting means, a third rigid connecting means attached to the other ends of said second pair of said flexible arms and spanning the space therebetween, said second pair of arms also being flexible only in the direction of the longitudinal axis of said tool supporting means, said third rigid connecting means having upwardly directed end parts, a third pair of flexible arms each having one of their ends attached to a respective one of said upwardly directed end parts of said third rigid connecting means, said third pair of flexible arms being flexible only in directions normal to the longitudinal axis of said tool suporting means, a yoke member extending between the other ends of said third pair of flexible arms and having its opposed ends universally connected to the respective ends of said third pair of flexible arms, a block having a lens blank to be surfaced mounted thereon, means on said yoke for connecting said block thereto, a head part on said machine pivotally supported on said base, rotatable eccentric means on said head part adapted to engage said lens blank holding means and, when actuated, cause said lens blank to travel in circular paths relative to said forming tool, adjustable means on said head part for moving said eccentric means into engagement with said lens blank holding means and causing a lens blank being surfaced to engage said tool, further means functioning cooperatively wtih said adjustable means for applying and maintaining predetermined pressures on said lens blank during a surfacing operation, means for rotating said eccentric means and simultaneously acting means for oscillating said head part by pivoting the same on said base to cause said lens to be moved back and forth, transversely over said tool while simultaneously being actuated to travel in said circular paths.

References Cited in the file of this patent

UNITED STATES PATENTS

| | | |
|---|---|---|
| 1,989,939 | Maynard | Feb. 5, 1935 |
| 2,715,803 | Bronson | Aug. 23, 1955 |